June 29, 1948. W. H. BRUCE ET AL 2,444,279
STEERING BY DRIVING CONTROL MECHANISM
Filed Sept. 8, 1945 4 Sheets-Sheet 2

Inventors
William H. Bruce
Douglas W. Erskine
by
Attorney

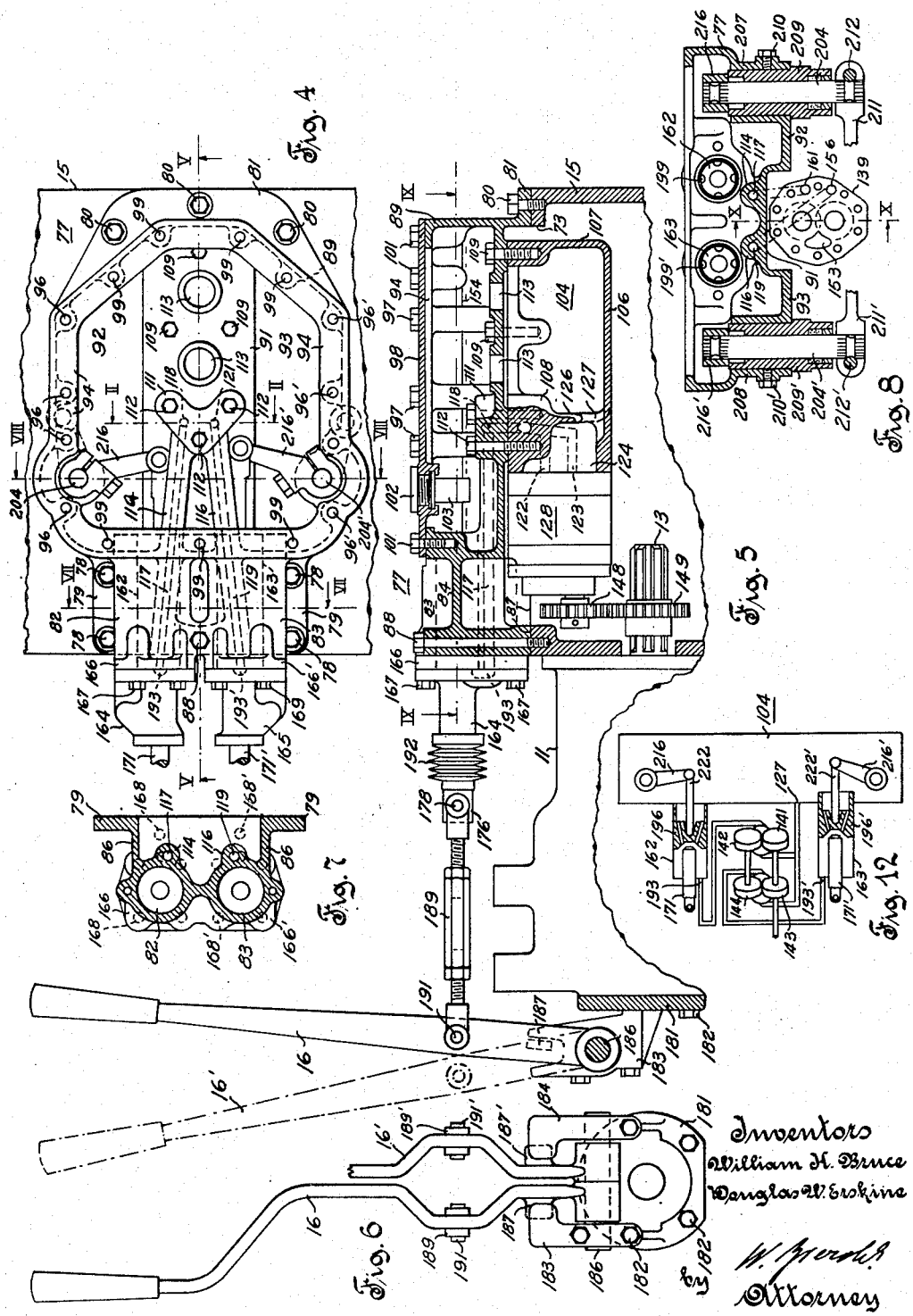

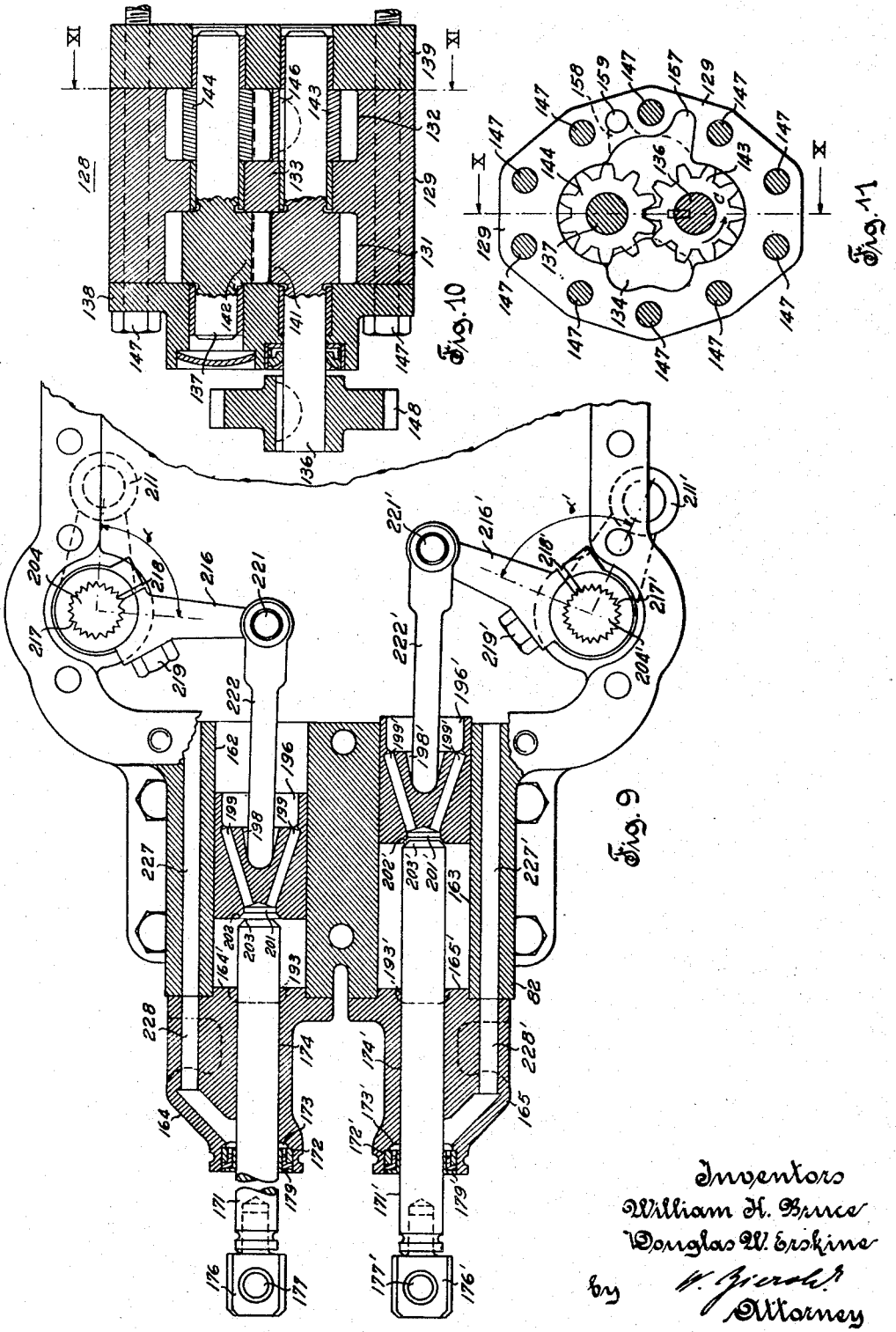

Patented June 29, 1948

2,444,279

UNITED STATES PATENT OFFICE 2,444,279

STEERING BY DRIVING CONTROL MECHANISM

William H. Bruce and Douglas W. Erskine, Springfield, Ill., assignors to Allis-Chalmers Manufacturing Company, Milwaukee, Wis., a corporation of Delaware Application September 8, 1945, Serial No. 615,230

5 Claims. (Cl. 180—9.2)

1

The invention relates to motor vehicles, and more particularly to motor vehicles of the type which are steered by driving, that is, in which steering is effected by controlling the drive of ground engaging traction devices at opposite sides of the vehicle.

In such vehicles the necessary provisions for controlling the drive may be made, according to well-known principles, either with or without the use of a differential mechanism between the traction devices. If a differential mechanism is used, the prevalent practice is to control the drive of the traction devices by means of a pair of selectively operable steering brakes, one for each traction device; and if no differential mechanism is used, the drive is usually controlled by a pair of selectively operable steering clutches, preferably of the friction type and usually in combination with a pair of selectively operable supplemental brakes, one clutch and one supplemental brake for each traction device.

The practice of controlling the drive by means of a differential and steering brakes, as well as the practice of controlling the drive by means of steering clutches in combination with supplemental brakes has been widely adopted in tractors, particularly in tractors of the self-laying track type. In both instances the tractor is usually equipped with a pair of hand levers, one for each hand of the operator, and in the first instance, where the tractor is equipped with a differential, the hand levers are arranged to control the steering brakes, whereas in the second instance where the drive is controlled without a differential, the hand levers are arranged to control the steering clutches. It is desirable in order to save the operator from undue fatigue that the mentioned hand levers be operable with a minimum of physical effort, and generally, it is an object of the invention to provide an improved steering control mechanism which will satisfactorily take care of said requirement.

More particularly it is an object of the invention to provide in a motor vehicle of the type in which steering is effected by means of a pair of steering clutches, an improved mechanism for operating said clutches.

As stated, hereinbefore, the steering clutches are preferably of the friction type, and the necessary power for holding said friction clutches engaged during straight ahead drive is usually supplied by suitable loading springs for the clutches. The mentioned hand levers are connected, respectively, with the steering clutches through suitable power transmitting linkages

2 which function to compress the loading springs and thereby release the clutches upon pull on the hand levers. The clutches, particularly in the larger size tractors, require a relatively high spring pressure in order to hold them properly engaged, and the leverage afforded by the usual power transmitting linkages is such that the operator must exert considerable manual effort in order to disengage the clutches and hold them disengaged when necessary. Consequently, when the tractor is operated in service which requires frequent manipulation of the steering levers, a good deal of physical work is required on the part of the operator in order to drive the tractor.

In order to relieve the operator from undue physical exertion, booster mechanisms have heretofore been suggested for facilitating operation of the steering clutches, and in certain instances, according to such earlier suggestions, the steering clutches were to be actuated by hydraulic servomotors, and hydraulic power for operating the servomotors was to be derived from the vehicle engine. However, it has been found difficult to accomplish the desired end of facilitating operation of the steering clutches in the proposed manner, that is, by means of a pair of hydraulic servomotors and an engine driven pump mechanism, because proper steering of the vehicle, if it is to be effected by control of the steering clutches, imposes certain requirements upon the mode of operation of the servomotors. That is, the servomotor for the right hand steering clutch must be operable precisely to move the right hand steering clutch from a fully engaged to a fully disengaged position and to any desired partly disengaged position; to move said clutch from said fully disengaged position and from any partly disengaged position to fully engaged position, and to hold said steering clutch partly or fully disengaged for any desired length of time, all without appreciably affecting the operability and operativeness of the servomotor for the left hand steering clutch; and, on the other hand, the servomotor for the left hand steering clutch must be operable precisely to move the left hand steering clutch from a fully engaged to a fully disengaged position and to any desired partly disengaged position, to move said clutch from said fully disengaged position and from any partly disengaged position to fully engaged position, and to hold the left hand steering clutch partly or fully disengaged for any desired length of time, all without appreciably affecting the operability and operativeness of the servomotor for the right hand steering clutch. On the other hand, if the servomotors are to be used for operating steering brakes such as are usually employed in combination with a differential, they must obviously be capable of an analogous mode of operation.

In order to provide for a mode of operation of the servomotors in conformity with the requirements as outlined hereinabove, and particularly in connection with steering clutches, a control system has heretofore been suggested which utilizes an engine driven pump and a series of interdependent valve mechanisms for controlling the passage of pressure fluid from the pump to the servomotors. The interdependent valve mechanisms were found necessary in order to direct pressure fluid from the pump mechanism alternatively to one or the other of the servomotors, and to direct the pressure fluid to both servomotors, when necessary, and to hold the steering clutches partially or fully disengaged for any desired length of time. In addition to said interdependent valve mechanisms, the mentioned previously suggested system requires supplemental valve mechanisms to prevent "kick-back" or sudden reengagement of one of the clutches when said clutch has been partly or fully disengaged, and thereafter the other clutch is disengaged by operation of its respective servomotor.

It is an object of the invention to provide an improved motor vehicle of the type in which steering if effected by driving, and more particularly to provide in such a vehicle an improved steering control mechanism utilizing a pair of hydraulically operable servomotors and a pump mechanism supplied with energy from the vehicle motor for operating the servomotors. In this connection, it is a more specific object of the invention to provide an improved arrangement of a pump mechanism, servomotors and control means for the latter, in combination with friction devices such as steering clutches or steering brakes, for operating such friction devices in conformity with the special requirements as outlined hereinabove, and more particularly to provide a system which will do so without an undue multiplicity of valve mechanisms and fluid passages, and without unduly complicated valve structures.

The conventional manually operated control mechanisms for steering clutches, as heretofore used, have ordinarily been so constructed that the amount of pull which must be exerted upon the hand levers in order to disengage the clutches increases, due to the increasing resistance of the loading springs, as the hand levers are moved towards their fully disengaged positions, and with such control mechanisms operators often acquire a habit of moving the hand levers only far enough to partially disengage the clutches at times when it would be appropriate to move the hand levers to positions corresponding to full disengagement of the clutches. Obviously, such a habit of operating the steering clutches is very objectionable because of the resulting rapid wear of the friction material. Moreover, the heat which is generated when power is transmitted through the partially engaged clutches for an undue length of time may result in a breakdown of the friction material, and it may also cause failure of the clutches due to overheating of the loading springs and consequent loss of spring tension.

A further object of the invention is to provide in a motor vehicle of the type in which steering is effected by means of a pair of steering clutches, an improved steering control mechanism by means of which operation of the steering clutches is sufficiently facilitated so that an operator may drive the vehicle, without undue fatigue, in continuous service under conditions requiring frequent operation of the steering clutches, and so that the operator will no longer be liable to fall into the aforementioned habit of only partially disengaging the steering clutches at times when they should be fully disengaged.

A further object of the invention is to provide an improved hydraulically operable control mechanism, as set forth hereinbefore, in which a pair of manually operable control levers, one for each steering clutch, are arranged so that the levers tend to adjust themselves automatically to clutch engaged positions, and in which the steering clutches may be gradually disengaged in response to progressive movement of their respective control levers in clutch releasing directions, and vice versa; and in which each clutch may be maintained, if desired or necessary for proper steering, in any condition of partial disengagement by adjusting its respective control lever to and holding it in a corresponding position intermediate the fully engaged and the fully disengaged positions of the clutch.

A further object of the invention is to provide in a control system of the above character a servomotor and pump arrangement which may be installed on and removed from the vehicle as a compact unit while the steering clutches are in place on the vehicle, and to provide such a unit which may be manufactured at relatively low costs.

The foregoing and other objects and advantages of the invention will become more fully apparent from the following description of a preferred embodiment of the invention shown in the accompanying drawings. Referring to the drawings, in which like reference characters designate the same or similar parts in the several views:

Fig. 4 is a top view of part of the hydraulically operable control mechanism for the steering clutches, a large housing enclosing certain parts of the mechanism being shown in full view, and a top aperture of the housing, which is normally closed by a cover, being shown exposed to afford a view of inside parts of the housing;

Fig. 5 is a side view of the hydraulically operable control mechanism for the steering clutches, the right hand part of this view being a section on line V—V of Fig. 4, and the left hand part of Fig. 5 showing a pair of manually operable control levers and their mounting on the tractor body;

Fig. 6 is an end view of Fig. 5 showing the mounting of the manually operable control levers on the tractor body;

Fig. 7 is a section on line VII—VII of Fig. 4, showing cylinder bores and fluid passages in the upper part of the mechanism;

Fig. 8 is a section on line VIII—VIII of Fig. 4;

Fig. 9 is an enlarged view similar to Fig. 4 but showing parts of the mechanism in section on line IX—IX of Fig. 5 and in differently adjusted positions;

Fig. 10 is a longitudinal section through a twin pump mechanism, the section being taken on line X—X of Fig. 8;

Fig. 11 is a section on line XI—XI of Fig. 10; and

Fig. 12 is a flow diagram of the mechanism shown in Figs. 4 and 5.

Figure 1:
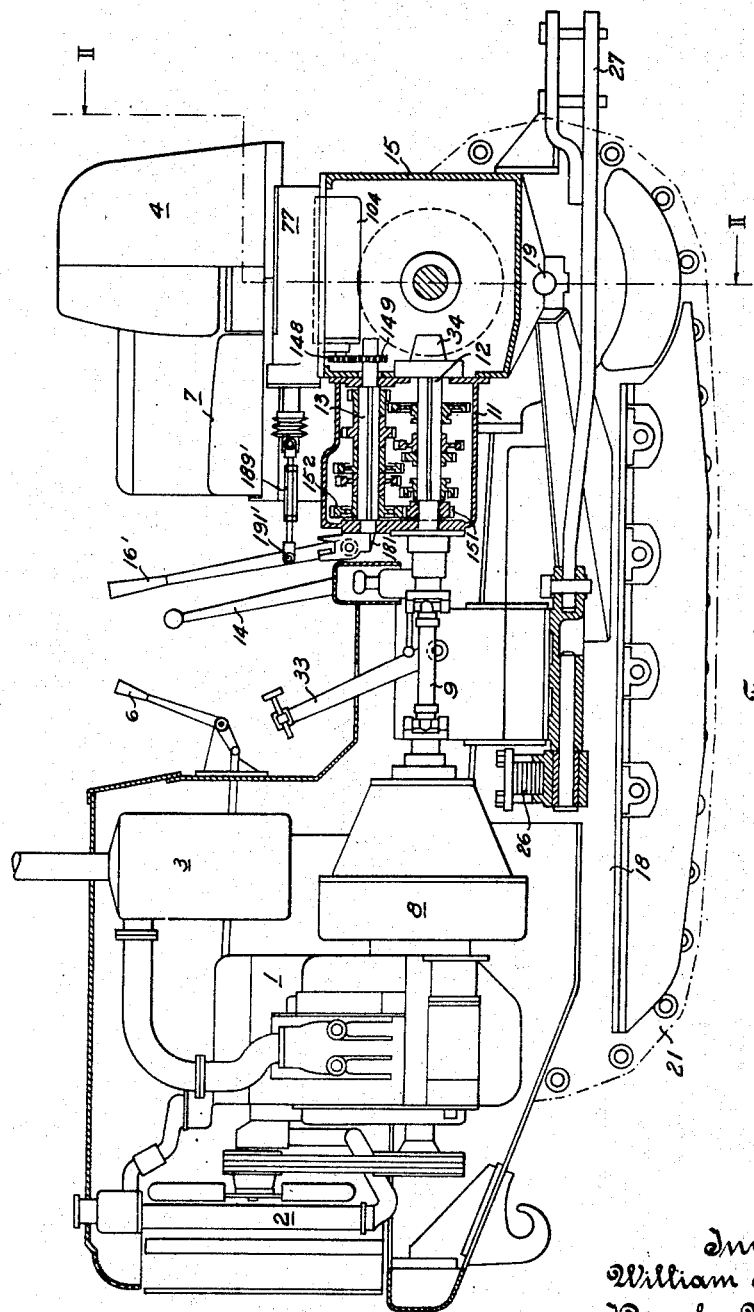
Fig. 1 is a sectional side view of a crawler tractor, showing the location and general arrangement of the improved control mechanism for the steering clutches on the rearward body part of the tractor.

The tractor shown in Fig. 1 is of the endless track type and, in conformity with conventional practice, comprises a main frame and a pair of endless track mechanisms at opposite sides, respectively, of the main frame; a power plant and suitable mechanism for transmitting power from the power plant to the endless track mechanism being mounted on the main frame. The power plant as shown in Fig. 1 comprises an internal combustion engine 1 and accessories therefor such as a radiator 2, an air cleaner 3 and a fuel tank 4, the radiator and air cleaner being mounted in proximity to the engine on a forward part of the main frame, and the fuel tank in the present instance being mounted on a rearward part of the tractor. A throttle control lever for the engine is indicated at 6, and an operator's seat 7 is mounted on the main frame in front of the fuel tank 4.

The mechanism for transmitting power from the engine 1 to the endless track mechanisms at opposite sides of the tractor, comprises a master clutch of conventional construction not shown and which is enclosed in a bell housing 8 at the rear of the engine, a propeller shaft 9, a change speed transmission enclosed in a housing 11 and comprising an output shaft 12, a counter shaft 13 and a gear shift lever 14; and means for steering the tractor by driving enclosed in a rear housing structure 15 of the main frame and controlled by a pair of hand levers 16 and 16' (Figs. 1 and 6).

The endless track mechanisms at opposite sides of the main frame are of identical and conventional construction, each comprising a track frame 18 which is pivoted on the main frame for vertical swinging movement about a transverse axis indicated at 19. Endless track belts 21 and 21' (Fig. 2) are mounted for travel around the track frames by means of track rollers and front idlers (not shown) and by means of track belt drive sprockets, the latter being indicated at 23 and 23' in Fig. 2. The track belt drive sprockets are mounted on the main frame for rotation about the mentioned pivot axis 19, and a transverse leaf spring 26 supports the main frame on forward portions of the track frames, all in conformity with generally accepted practice. A drawbar for hitching a load to the tractor is indicated at 27.

Figures 2, 3:
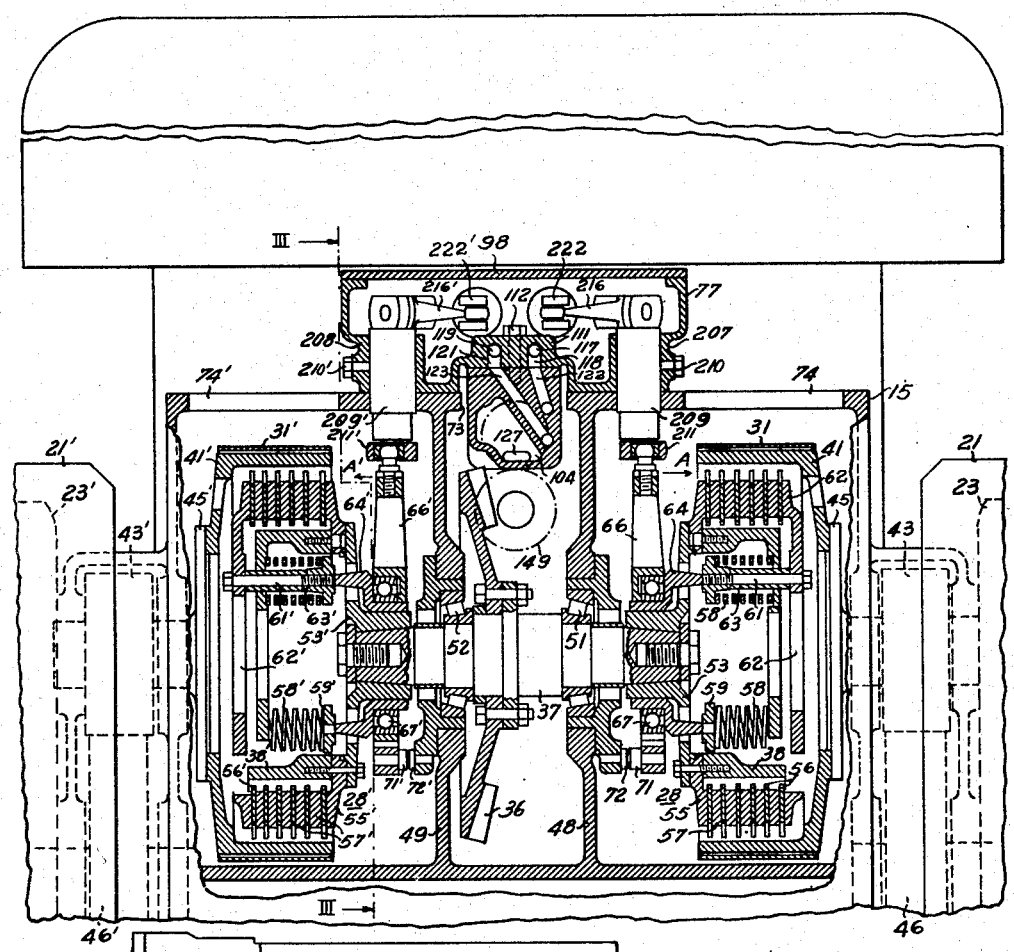
Fig. 2 is a partial rear view of the tractor shown in Fig. 1, the view being taken partly in section on line I—I of Figs. 1 and 4 to show the steering clutches and associated control mechanism.
Fig. 3 is a view, on line III—III of Fig. 2, showing a shift yoke for the steering clutch at the left side of the tractor, and its connection (in section) with the hydraulically operable control mechanism.

Referring to Fig. 2, it will be noted that for purposes of illustrating the invention, a tractor has been selected in which the drive of the traction devices is controlled without the use of a differential, a pair of steering clutches being indicated generally at 28 and 28', and a pair of supplemental brakes being indicated at 31 and 31'. The brakes are controlled in conformity with conventional practice by foot pedals, respectively, one of which is shown at 33 in Fig. 1. For straight ahead driving both of the steering clutches are fully engaged and the supplemental brakes are released so that both track belt drive sprockets 23 and 23' may be rotated in unison by the driving torque of the engine 1. Such driving torque is transmitted from the crank shaft of the engine through the master clutch at 8 to the propeller shaft 9, then through any selected gear combination of the change speed transmission and through intermeshing bevel gears 34 and 36 to a cross shaft 37 which carries driving drums 38 and 38', respectively, of the steering clutches; and then simultaneously through stacks of clutch disks and through driven drums 41 and 41' of the steering clutches to final drive pinions 43 and 43' which are permanently geared to the track belt drive sprockets 23 and 23', respectively, through suitable gearing as indicated at 46 and 46'.

The cross shaft 37 which carries the bevel gear 36 extends through aligned openings in partitions 48 and 49 of the rear housing 15, and the cross shaft 37 is mounted in said openings by a pair of conical roller bearings 51 and 52. The driving drums 38 and 38' of the steering clutches are bolted, respectively, to radial flanges of driving hubs 53 and 53', which are non-rotatably mounted on the cross shaft 37 at opposite ends of the latter. A circumferential series of axially extending outer keys are formed on the drum 38, and the latter is surrounded by a stack of clutch disks comprising a number of metallic internally toothed disks 56 which are drivingly engaged by the keys of the driving drum 38', and by a number of externally toothed friction disks 57 which are drivingly engaged at their outer peripheries by internal axially extending keys of the driven drum 41 and alternate with the metallic driving disks 56. A flange 55 is interposed between the driving hub 53 and the driving drum 38 to afford an axial abutment for the stacked clutch disks 56, 57. The driven drum 41 is mounted on a large flange 45 of the supporting shaft for the final drive pinion 43, and the brake band 31 surrounds the drum 41 and may be tightened thereon for braking purposes through a suitable mechanism, not shown, which is operable by the foot pedal 33.

Axial pressure for compressing the stack of disks 56 and 57 is supplied by a circumferential series of coiled loading springs 58 which are arranged at the inside of the driving drum 38 and are seated axially on radial lugs projecting towards the interior of the drum 38 at the end of the latter remote from the driving hub 53. The free ends of the coil springs 58 adjacent to the driving hub 53 bear against an axially floating ring 59 which carries a plurality of long bolts 61 corresponding in number to the number of loading springs 58, the bolts 61 extending axially, respectively, through the coiled springs 58. Mounted on the bolts 61 is a thrust plate 62 for exerting pressure upon the stacked clutch disks 56, 57 towards the driving hub 53. The loading springs 58 are under appreciable initial tension and they subject the ring 59 to a strong axial pressure in the direction towards the driving hub 53. Such axial pressure upon the ring 59 is transmitted to the thrust plate 62 through the bolts 61, the heads of the latter bearing against the thrust plate at the side of the latter remote from the driving hub 53. Tubular spacers 63 surrounding the bolts 61 are interposed between the floating ring 59 and the thrust plate 62 for securing the latter at a predetermined axial distance from the ring 59.

The driving hub 53 has a central sleeve portion for mounting a spider 64 thereon, the spider being fitted upon the sleeve portion for shifting movement axially thereof and having abutment arms extending axially through suitable apertures of the driving hub towards the floating ring 59. A shifter yoke 66 for moving the spider 64 axially back and forth on the sleeve portion of the driving hub 53 is mounted on the hub of the spider by means of a ball bearing 67.

The left hand steering clutch 28' is a duplicate of the right hand steering clutch 28, as will be apparent from an inspection of Fig. 2. Clutch disks 56' and 57' corresponding to the clutch disks 56 and 57 are operatively interposed between the driving drum 38' and the driven drum 41', and in conformity with the corresponding parts of the right hand steering clutch the left hand steering clutch comprises an abutment flange 55', initially tensioned loading springs 58', an axially floating ring 59', bolts 61', a thrust plate 62', tubular spacers 63' and a spider 64'. A clutch shifter yoke 66' for the left hand steering clutch 28' is mounted on the hub of spider 64' by means of a ball bearing 67'.

Referring to Fig. 3, the outer race of the ball bearing 67' carries a pair of diametrically opposed journal bearings for the reception of journals 68 and 69 which are rigidly mounted on the shifter yoke 66', and the latter is thus swingable about a horizontal axis at right angles to the shaft 37. At a lower portion of the yoke 66' a thrust button 71' is mounted on the latter opposite to a complementary thrust button 72' on the retainer for the roller bearing 52.

Swinging movement of the yoke 66' about the axis of the journals 68, 69 in a direction to force the thrust button 71' against the thrust button 72' causes axial shifting movement of the spider 64' towards the driving hub 53'. Such shifting movement of the spider is transmitted through the arms of the latter to the axially floating ring 59', and the resulting axial shifting movement of the ring 59' is transmitted to the thrust plate 62' through the tubular spacers 63'. The axial distance between the thrust plate 62' and the abutment flange 55' will therefore be increased when the yoke 66' is moved in the mentioned direction which is indicated by the arrow A' in Fig. 2. However, such movement of the yoke 66' is strongly resisted by the pressure of the loading springs 58' which, like the loading springs 58, are under appreciable initial tension, and which tend to move the yoke 66' in a direction opposite to that indicated by the arrow A' until the entire pressure of the loading springs is taken up by the abutment flange 55' through the stacked clutch disks 56', 57'. The stacked clutch disks 56', 57' are thus normally subject to axial compression by the initial tension of the loading springs 58', and when the stack of clutch disks is thus compressed frictional engagement of disks 56' with the disks 57' establishes a driving connection between the driving drum 38' and the driven drum 41'. The length of the tubular spacers 63' is such that when the thrust plate 62' is fully drawn up against said spacers by the bolts 61', as shown in Fig. 2, the loading springs 58' are sufficiently compressed to exert the necessary axial pressure to which the stacked clutch plates must be subjected in order to prevent slippage between the clutch disks under the maximum torque which is to be transmitted from the driving drum 38' to the driven drum 41'. From these explanations it will be apparent that the steering clutch 28' is fully engaged when the parts are positioned as shown in Fig. 2, and that the clutch 28' may be gradually released by swinging movement of the yoke 66' from the position in which it is shown in said figure about the axis of the journals 68, 69 in the direction indicated by the arrow A' in Fig. 2.

The foregoing explanations with respect to the construction and operability of the left hand steering clutch 28' similarly apply to the construction and operability of the right hand steering clutch 28. The latter clutch, like the left hand steering clutch, is fully engaged as shown in Fig. 2, and it may be gradually released by swinging movement of the shift yoke 66 in the direction of arrow A. The thrust buttons 71 and 72 at the lower end of the shift yoke 66 correspond to the thrust buttons 71' and 72' of the shift yoke 66'.

The hand levers 16 and 16' which, as mentioned hereinbefore, are mounted on the tractor in front of the driver's seat 7 serve to control the steering clutches 28 and 28', respectively. More specifically, the hand levers serve to control a pair of hydraulic servomotors which in turn are operatively connected with actuating members for the steering clutches, that is, with the shifter yokes 66, 66'.

Referring to Figs. 2, 4 and 5, the central compartment of the rear housing 15 of the main frame, which encloses the bevel gears 34 (Fig. 1) and 36 (Fig. 2) has an oblong top opening 73, and the lateral compartments of the housing 15 which contain the steering clutches 28, 28', and the brakes 31, 31', have relatively large top openings 74 and 74', respectively, which are normally closed by removable covers, not shown. Mounted on top of the housing 15, between the clutch compartment openings 74, 74' and over the central top opening 73, is a one-piece support 77 in the form of a casting which, as shown in Fig. 4, comprises a forward cylinder block and a rearward housing portion. The support 77 is secured to the top wall of the housing 15 by four short bolts 78 which extend through lateral flange portions 79 of the cylinder block, and by three short bolts 80 which extend through a flange 81 at the rear of the housing portion of the support 77. Referring to Fig. 7 which shows a vertical transverse section through the forward cylinder block, the latter comprises two horizontal barrel portions 82 and 83 which extend side by side in the longitudinal direction of the tractor and which are connected with each other by a web 84. Vertical webs 86 connect the barrels 82 and 83, respectively, with the flange portions 79, and the space between the webs 86 and below the barrels 82, 83 and below the web 84 is open at the bottom and communicates with the interior of the housing 15 through the mentioned central aperture 73 of the latter. However, the mentioned space below the barrels is closed at its forward end by a vertical transverse wall portion which merges with the barrels 82 and 83 and extends between the flange portions 79, and said transverse wall portion has a lower flat surface 87 as indicated in Fig. 5 for seating the cylinder block on the top of housing 15. The forward part of the top opening 73 is thus closed by the forward part of the support 77, and a long bolt 88 extends through a solid part of the support 77 between the barrels 82, 83, as shown in Fig. 5, to further secure the support 77 to the housing 15.

The barrel portions 82 and 83 merge at their rearward ends with the mentioned housing portion of the support 77, and as shown in Figs. 4 and 5 said housing portion comprises a vertically disposed continuous circumferential wall 89, a central raised bottom wall portion 91 merging at its front and rear ends with the circumferential wall 89, and lateral bottom wall portions 92 and 93 (see Fig. 8) which are disposed on a common level with the flange portions 79 and 81. The lateral bottom wall portions merge at their front and rear ends, and at their sides remote from the central raised portion 91, with the circumferential wall 89, and they also merge with the central raised portion 91 along the longitudinal edges of the latter. The vertical circumferential wall 89 has a continuous inturned flange 94 along its upper edge, and four bolt holes 96 extend through the vertical wall 89 and through the flange 94 at one side of the support 77, which side is the right side on the tractor, for the reception long bolts 97 (Fig. 5) by means of which the support 77 is further secured to the top wall of the housing 15. A corresponding series of bolt holes 96' are provided for the same purpose at the other side of the support 77, which other side is the left side on the tractor. A cover 98 for the housing portion of the support 77 is retained on the flange 94 by the bolts 97, as shown in Fig. 5, but for the purpose of exposing the interior of the housing portion the cover 98 is omitted in Fig. 4. Additional bolt holes 99 are provided in the flange 94 and in the circumferential wall 89 for the reception of short bolts 101 (Fig. 5) by means of which the cover 98 is additionally secured to the support 77. As shown in Fig. 5, the cover 98 has a filler opening which is normally closed by plug 102, and said filler opening is fitted with a strainer 103. It will be seen that the central top opening 73 of the housing 15 is entirely covered by the one-piece support 77, and a gasket, not shown, is preferably interposed between the housing 15 and the support 77, such gasket surrounding the top opening 73.

A one-piece sump 104 is secured to the support 77 below the latter and extends through the top opening 73 of the housing 15 into the bevel gear compartment of the latter between the partitions 48 and 49, as shown in Figs. 2 and 5. The sump 104 has a bottom wall 106, a rear wall 107, vertical longitudinal side walls merging with the bottom wall 106 and with the rear wall 107, and a forward manifold head 108 extending between and merging with the longitudinal side walls. The sump 104 is secured to the underside of the central raised bottom portion 91 of the support 77 by bolts 109 which extend through the raised bottom portion 91 of the support, one of the bolts 109 being screwed into a tapped hole in the rear wall 107 of the sump, and the other two bolts 109 being screwed into tapped holes in the right and left side walls, respectively, of the sump. The raised bottom portion 91 of the support 77 has a substantially V-shaped boss 111 overlying the manifold head 108 of the sump, as shown in Figs. 2, 4 and 5, and three bolts 112 extend through the boss 111 into tapped holes of the manifold head 108 to additionally secure the sump 104 to the support 77. The portion of the sump between the rear wall 107, the manifold head 108, and the right and left side walls of the sump is open at the top, and the housing portion of the support 77 communicates with the sump through two relatively large bores 113 in the central raised bottom portion 91 of the support 77. A gasket, not shown, is preferably interposed between the bottom portion 91 of the support 77 and the top of the sump 104, and as shown in Fig. 2, the sump 104 has a recessed portion at its lower left hand corner to afford clearance for the bevel gear 36.

As shown in Figs. 4 and 8, a pair of horizontal diagonal ribs 114 and 116 are formed on the support 77 and diverge forwardly from the V-shaped boss 111, the portions of the ribs which extend between the boss 111 and the vertical circumferential wall 89 of the support rising from the raised bottom portion 91 of the support 77, as shown in Fig. 8, and the portions of the ribs which extend between the circumferential wall 89 and the front end of the cylinder block projecting downwardly from the barrel portions 82 and 83, respectively, as shown in Fig. 7. A straight horizontal fluid passage 117 extends through the rib 114 from a vertical flat front face of the barrel portion 82 into the boss 111, and a short vertical bore 118 which is drilled into the boss 111 from the underside of the support 77 merges with the rear end of the horizontal passage 117, as best shown in Figs. 2 and 4. Another straight horizontal fluid passage 119 extends through the rib 116 from a vertical flat front face of the barrel portion 83 into the boss 111, and a short vertical bore 121 which, like the bore 118, is drilled into the boss 111 from the underside of the support 77, merges within the boss 111 with the rear end of the passage 119, as shown in Figs. 2 and 4.

The short vertical bores 118 and 121 of the boss 111 communicate at their lower ends with internal passages 122 and 123, respectively, of the manifold head 108 of the sump 104. As shown in Fig. 2, the passage 122 extends obliquely downwardly and to the right of the manifold head and then continues horizontally in a forward direction towards the forward end of the sump 104, as shown in Fig. 5. The internal passage 123 of the manifold head 108 likewise extends obliquely downwardly to the right and then continues horizontally in a forward direction, below the horizontal portion of the passage 122, towards the forward end of the sump, as shown in Figs. 2 and 5. The front face of the manifold head 108 extends in a vertical plane and contains two holes formed by the passages 122 and 123, respectively, one above the other and both offset towards the right, as indicated in Fig. 2. In addition to the holes formed by the passages 122, 123, the front face of the manifold head contains a relatively large central aperture in communication with a cavity 124 of the sump which is indicated in Fig. 5. The cavity 124 is bounded by the bottom and side walls of the sump, by the manifold head 108, and by a skirt portion 126 of the manifold head 108, and a hole 127 is formed in the lower part of the skirt portion 126 through which hole the cavity 124 communicates with the part of the sump in rear of the manifold head 108, this latter part of the sump communicating, as stated, with the housing part of the support through holes 113. The passages 122 and 123 communicate with a pump mechanism 128 which is mounted on the sump 104 at the forward end of the latter and which is shown in Figs. 8, 10 and 11.

Referring to Figs. 10 and 11, the pump mechanism 128 is a twin pump unit of the gear wheel positive displacement type and, in effect, constitutes a compact assembly of two individual gear pumps which are operable in unison to draw fluid, preferably oil, from the sump 104 and to deliver such fluid under pressure into the manifold passages 122 and 123, one of the gear pumps supplying the passage 122 and the other supplying the passage 123. As shown in Figs. 10 and 11, the twin pump unit comprises a polygonal central body portion 129 which is axially recessed from both ends to provide a forward gear chamber 131, a rearward gear chamber 132 and a central vertical partition 133 between the gear chambers.

The partition 133 has an axial aperture 134, as shown in Fig. 11, through which the gear chambers communicate with each other, and a pair of rotary shafts 136 and 137 are journaled in axial bores of the partition in laterally offset relation to the aperture 134. A front cover 138 and rear plate 139 provide additional supports for the shafts 136 and 137. A pair of intermeshing pump gears 141 and 142 are integrally formed, respectively, with the shafts 136 and 137, and are enclosed in the forward gear chamber 131. Another pair of intermeshing pump gears 143 and 144 are mounted, respectively, on the shafts 136 and 137 and are enclosed in the rearward gear chamber 132, the gear 143 being non-rotatably secured to the shaft 136 by a key 146. The body part 129, the cover 138 and the rear plate 139 are tightly held together by ten long bolts 147 which extend through aligned holes of these parts and are threaded into tapped holes of the sump casting 104, the rear face of the plate 139 bearing tightly against the vertical front face of the sump 104.

The shaft 136 extends forwardly through the cover 138, and a spur gear 148 is keyed to the forwardly projecting end of the shaft 136. As shown in Figs. 1 and 5, the transmission counter shaft 13 extends rearwardly from the transmission casing 11 into the rear housing 15, and a gear 149 in constant mesh with the gear 148 is mounted on the splined rear end of the transmission countershaft 13 for supplying the pump mechanism 128 with energy from the tractor motor 1. The countershaft 13 of the transmission is permanently geared through a pair of gears 151, 152 to the propeller shaft 9, in conformity with conventional practice, and therefore the pump mechanism 128 will be driven whenever the engine 1 is running and the master clutch at 8 is engaged, irrespective of whether the change speed transmission controlled by the gear shift lever 14 is in gear or in neutral.

Referring again to Fig. 11, the arrow C indicates the direction of rotation of the pump gears 141 and 143 when the engine 1 is running and the master clutch is engaged, as mentioned hereinabove. The end plate 139 has a fluid inlet passage 153 (Fig. 8) in axial alignment with and of the same configuration as the passage 134 shown in Fig. 11, and said inlet passage 153 of the end plate 139 communicates with the aforementioned cavity 124 of the sump. The sump 104 and the housing portion of the support 77 are normally filled with oil approximately to the level indicated by the dash-dotted line 154 in Fig. 5, and when the gears 141 and 143 rotate in the direction of arrow C, oil will therefore be drawn from the sump 104 into the pump mechanism. The end plate 139, as shown in Fig. 8, further has an axial through bore 156 which communicates with a pocket 157 of the rearward gear chamber 132 at the pressure side of the pump gears 143 and 144. Accordingly, when the shaft 136 is driven, as mentioned hereinbefore, the rearward pump gears 143, 144 will continuously deliver pressure fluid through the bore 156, which constitutes the discharge port of the rearward pump unit, into the manifold passage 123 which in turn communicates with the horizontal oblique fluid passage 119 (Fig. 4) of the support 77 as explained hereinbefore, and as indicated by dash-dotted lines in Fig. 8.

The forward gear chamber 131 of the pump body 129 has a pocket 158, similar to the pocket 157, at the pressure side of the pump gears 141, 142, and a horizontal bore 159 is drilled into the body 129 from the rear face of the latter and terminates in the pocket 158. The end plate 139 has an axial through-bore 161, as shown in Fig. 8, in communication with the horizontal bore 159 of the pump body 129, and the through-bore 161, therefore, constitutes the discharge port of the forward pump unit. The bore or discharge port 161 communicates with the manifold passage 122 which in turn communicates with the horizontal oblique fluid passage 117 (Fig. 4) of the support 77, as explained hereinbefore and as indicated by dash-dotted lines in Fig. 8. It will thus be seen that when the pump shaft 136 is rotated in the direction of arrow C in Fig. 11, the forward pair of pump gears 141, 142 and the rearward pair of pump gears 143, 144 will simultaneously draw oil from the sump 104, and the forward pair of pump gears 141, 142 will discharge oil under pressure through the discharge port 161, manifold passage 122 and vertical bore 118 into the oblique horizontal fluid passage 117 of the support 77, while the rearward pair of pump gears 143, 144 will simultaneously discharge oil under pressure through the discharge port 156, manifold passage 123 and vertical bore 121 into the oblique horizontal passage 119 of the support 77.

The forward portion of the support 77 which has been referred to hereinabove as a cylinder block and which comprises the two barrel portions 82 and 83, has two cylinder bores 162, 163, the bore 162 extending clear all the way through the barrel portion 82, and the bore 163 extending clear all the way through the barrel portion 83. Secured to the cylinder block at the forward end of the latter are two plunger brackets 164, 165, the plunger bracket 164 having an annular shoulder 164' fitted into the cylinder bore 162 as shown in Fig. 9, and the plunger bracket 165 having an annular shoulder 165' fitted into the cylinder bore 163. The plunger bracket 164 is suitably flanged for bolting to a flange portion 166 of the barrel portion 82, the flange portion 166 having five blind tapped holes 168, as shown in Fig. 7, for the reception of mounting bolts 167 shown in Fig. 4, and the plunger bracket 165 is similarly secured to a flange portion 166' of the barrel portion 83 by five mounting bolts 169 screwed into blind tapped holes 168'.

Reciprocably mounted in an axial bore of the bracket 164 is a solid plunger 171, the bore for the plunger 171 in the bracket 164 comprising three sections on an axis coinciding with the axis of the cylinder bore 162, namely, a first relatively short section 172 adjacent the forward end of the bracket 164, which is of substantially larger diameter than the plunger 171, a second still shorter section 173 which is of smaller diameter than the section 172 but of larger diameter than the plunger 171, and a third section 174 of substantial length which extends between the section 173 and the rear face of the annular shoulder 164', and which is of a suitable diameter to afford a close but sliding fit of the plunger 171 in the bracket 164. The body portion of the plunger 171 has a smooth cylindrical outer surface of substantial length so that the plunger may be moved axially a considerable distance into the cylinder bore 162, and so that it may be moved forwardly to a position in which its rear end projects a relatively short distance rearwardly from the annular shoulder 164'. At its forward end the plunger 171 carries a coupling head 176 which has a hole 177 (Fig. 9) for the reception of a coupling pin 178 as shown in Fig.

5. A seal 179 (Fig. 9) surrounding the plunger 171 is mounted in the forward bore section 172 of the plunger bracket 164 to close the gap between the plunger 171 and the circumferential surface of the bore section 172. The bore section 173 provides an annular space behind the seal 179 for a purpose which will be explained hereinbelow.

Referring to Figs. 5 and 6, a mounting bracket 181 for the hand levers 16 and 16' is secured by bolts 182 to the forward end of the transmission housing 11. The bracket 181 comprises two transversely spaced vertical arms 183 and 184, and a cross pin 186 is supported at its opposite ends in the arms 183 and 184. The hand levers 16 and 16' are pivoted at their lower ends on the cross pin 186 and extend upwardly therefrom between the arms 183 and 184. The upper end of the bracket arm 183 is forked and the lever 16 has a stop lug 187 between the prongs of the forked arm 183, the stop lug 187 being engageable with one or the other of the prongs of the arm 183 to limit back and forth movement of the lever 16 about the pin 186. The hand lever 16' has a stop lug 187' similar to the stop lug 187, which is engageable with one or the other of two prongs formed at the upper end of the arm 184, for limiting back and forth movement of the hand lever 16' about the cross pin 186.

In Fig. 5 the hand lever 16 is shown in full lines in its rearmost position which corresponds to full disengagement of the right hand steering clutch 28, and the hand lever 16' is shown in dash-dotted lines in its foremost position which corresponds to full engagement of the left-hand steering clutch 28'. The hand lever 16 is operatively connected with the plunger 171 by means of a turnbuckle 189 which has a forward forked end embracing the hand lever 16 and a rearward forked end embracing the head 176 of the plunger 171, a pin 191 pivotally securing the forward forked end of the turnbuckle to the hand lever 16, and the mentioned pin 178 pivotally securing the rearward forked end of the turnbuckle to the plunger head 176. A bellows 192 of flexible material, such as oil-proof rubber, is secured at its forward end to the plunger 171 and at its rear end to a collar of the plunger bracket 164 to provide a protective enclosure for the body portion of the plunger 171 and the seal 179.

The plunger bracket 165 is an opposite hand duplicate of the plunger bracket 164, and the explanations given hereinabove with respect to the plunger bracket 164 similarly apply to the plunger bracket 165. That is, the plunger bracket 165 has a bore on an axis coinciding with the axis the cylinder bore 163 and comprising three sections 172', 173' and 174'. A seal 179' corresponding to the seal 179 is mounted in the bore section 172'. Reciprocably mounted in the bore section 174' of the bracket 165 is a solid plunger 171' which is an exact duplicate of the plunger 171 and which is operatively connected with the hand lever 16' in the same manner as explained hereinbefore in connection with the plunger 171 and the hand lever 16, a turnbuckle 189', corresponding to the turnbuckle 189, being indicated in Figs. 1 and 6 and pivotally secured to the hand lever 16' by a pin 191'.

As shown in Figs. 5 and 9, the plunger bracket 164 has a vertically extending cavity 193 at its rear end below the bore section 174, the cavity 193 communicating at its lower end with the forward end of the oblique horizontal fluid passage 117. The upper part of the cavity 193 communicates with the cylinder bore 162, and the cavity 193 thus forms an open fluid inlet passage at the forward end of the cylinder bore 162. Similarly, the plunger bracket 165 has a cavity 193' at its rear end, corresponding to the cavity 193 of the plunger bracket 164, the cavity 193' communicating at its lower end with the oblique horizontal fluid passage 119, and the upper part of the cavity 193' communicates, below the bore section 174', with the cylinder bore 163. The cavity 193' thus forms an open fluid inlet passage at the forward end of the cylinder bore 163.

A piston 196 is reciprocably mounted in the cylinder bore 162, as best shown in Fig. 9, the piston 196 having a relatively long cylindrical outer surface of a diameter slightly smaller than the diameter of the cylinder bore 162 so as to provide a close but sliding fit of the piston within the cylinder. For this purpose the cylinder bore may be honed and the piston ground so that the diameter of the latter will be slightly smaller, say ten thousandths of an inch, than the diameter of the cylinder bore 162. The piston 196 comprises a body portion and a skirt portion extending rearwardly from the body portion, a forwardly tapering socket 198 being formed in the rear part of the body portion and having a spherical seat at its forward end. A set of four rearwardly diverging fluid passages 199 are drilled into the body portion of the piston 196, these passages being equally distributed circumferentially of the piston, as indicated in Fig. 8. The passages 199 are open at their rear ends and communicate at their forward ends with a central recess 201 in the forward part of the piston, the recess having a circular chamfered edge 202 providing a conical valve seat. The plunger 171 has a short conical portion 203 at its rearward end of the same bevel as the chamfer 202, and as will be further referred to hereinbelow, the conical portion 203 of the plunger 171 may be moved into engagement with the valve seat 202 so as to close the recess 201 and, therefore, the fluid passages 199.

A piston 196' which is an exact duplicate of the piston 196 is reciprocably mounted in the cylinder bore 163, and the piston 196 is closely but slidably fitted into the cylinder bore 163 in the same manner as has been explained hereinbefore in connection with the piston 196 and the cylinder bore 162. The same reference characters which have been used in the description of the piston 196 are applied, in Fig. 9, to the piston 196' but are prime-indexed to denote their correlation with the piston 196, and the description of piston 196 similarly applies to the piston 196'. The plunger 171' has a short conical portion 203' at its rearward end which may be moved into engagement with the valve seat 202' of the piston 196' so as to close the recess 201' and, therefore, the fluid passages 199' of the piston 196'.

Referring again to Figs. 4 and 8, a pair of vertically disposed rock shafts 204 and 204' are mounted on the support 77 within the housing portion of the latter, a boss 207 for mounting the rock shaft 204, and a boss 208 for mounting the rock shaft 204', being formed within the housing portion of the support 77 at the left and right sides, respectively, of the latter. As shown in Fig. 2, the portion of the support 77 on which the boss 207 is formed overlies the lateral compartment of the housing 15 which encloses the right hand steering clutch 28, and the portion of the support 77 on which the boss 208 is formed overlies the lateral compartment of the housing 15 which encloses the left hand steering clutch 28'.

Fitted into the boss 207 is a bearing sleeve 209 which extends downwardly into the compartment for the steering clutch 28 through a hole in the top wall of the housing 15, and the sleeve 209 is secured against axial displacement within the boss 207 by a set screw 210. The rock shaft 204 is journaled in the bearing sleeve 209 and has an upper end projecting into the housing part of the support 77, and a lower end projecting into the compartment for the right hand steering clutch 28. The portion of the rock shaft 204, below the bearing sleeve 209, is splined and has a circumferential groove, and the portion of the rock shaft 204 above the bearing sleeve 209 is similarly splined and grooved, as shown in Fig. 8. A lower rock arm 211 for connecting the rock shaft 204 with the shift yoke 66 of the right hand steering clutch 28 is detachably mounted on the lower end of the rock shaft 204, a hub of the rock arm 211 having internal splines matching the lower splines of the rock shaft to secure the rock arm against rotary displacement on the rock shaft. The hub of the rock arm 211 also has a radial vertical split and a bore at right angles to the split for the reception of a clamping bolt 212 which is partly received in the lower circumferential groove of the rock shaft, to secure the rock arm against displacement axially of the rock shaft. By tightening the bolt 212 the rock arm 211 may be securely fastened on the rock shaft 204, and upon removal of the bolt 212 the rock shaft 204 and the rock arm 211 may be readily separated from each other in the axial direction of the shaft 204. The bolt 212 is accessible through the top opening 74 (Fig. 2) of the housing 15.

Another rock shaft 204' which is an exact duplicate of the rock shaft 204, is rotatably mounted in the boss 208 of the support 77 by means of a bearing sleeve 209' corresponding to the bearing sleeve 209, the bearing sleeve 209' being retained in the boss 208 by a set screw 210'. Detachably secured to the lower end of the rock shaft 204' is a lower rock arm 211' which is an exact duplicate of the rock arm 211, a clamping bolt 212' corresponding to the clamping bolt 212 being accessible through the top opening 74' (Fig. 2) of the housing 15.

Fig. 3 shows the connection between the lower rock arm 211' and the shift yoke 66' of the left hand steering clutch 28'. The shift yoke 66 of the right hand steering clutch 28 and the lower rock arm 211 of the rock shaft 204 are connected with each other in the same manner as shown in Fig. 3. Referring to Fig. 3, the free end of the rock arm 211' has a vertical bore lined with a bushing 213 which embraces a ball head 214 on the shift yoke 66', and rocking movement of the shaft 204' about its axis within the bearing sleeve 209' is transmitted through the lower rock arm 211' and ball head 214 to the shift yoke 66' so that the latter will swing sidewise about the axis of the journals 68, 69 in response to said rocking movement of the rock shaft 204'. Similarly, the shift yoke 66 for the right hand steering clutch is swingable sidewise in response to rocking movement of the rock shaft 204 about its axis within the bearing sleeve 209.

The upper end of the rock shaft 204 has longitudinal splines and a circumferential groove, as stated, the same as the lower end, and an upper rock arm 216 is detachably secured on the splined and grooved upper end of the rock shaft 204 in the same manner as has been explained hereinabove in connection with the lower rock arm 211. As best shown in Fig. 9, the hub of the upper rock arm 216 has internal splines 217 matching the upper splines of the rock shaft 204 to secure the rock arm 216 against rotary displacement on the rock shaft 204. The vertical radial split of the hub of the upper rock arm is indicated at 218 and the clamping bolt at 219. Pivotally connected with the free end of the upper rock arm 216 by means of a pivot pin 221 is a thrust rod 222, the pin 221 extending through a forked rearward end of the rod 222 which embraces an eye at the free end of the arm 216. The thrust rod 222 has a spherical forward end for abutment against the piston 196, the forward end of the thrust rod 222 being seated in the socket 198 of the piston 196 and its spherical forward end being adapted to bear against the spherical forward end of said socket 198.

The thrust rod 222, the upper rock arm 216, the rock shaft 204 and the lower rock arm 211 operatively connect the piston 196 with the shift yoke 66 of the right hand steering clutch 28, and the shift yoke 66' of the left hand steering clutch 28' is operatively connected with the piston 196' by a thrust rod 222', an upper rock arm 216', rock shaft 204' and lower rock arm 211', and the parts forming said last named connection are duplicates of the correspondingly designated parts of the connection between the piston 196 and the shift yoke 66 of the right hand steering clutch. A pivot pin 221' connects the rear end of the thrust rod 222' with the upper rock arm 216', and the latter is secured in position on the rock shaft 204' by a clamping bolt 219'.

The operation of the hereinabove described control mechanism for the steering clutches is as follows: Figs. 1 and 5 show the hand lever 16' in its foremost position, and as stated hereinbefore and as will appear hereinbelow, said position of the hand lever 16' corresponds to full engagement of the left hand steering clutch. Similarly, the foremost position of the hand lever 16 corresponds to full engagement of the right hand steering clutch, and with both levers 16, 16' adjusted to their foremost positions both track belts may be driven simultaneously to propel the tractor on a straight course.

Fig. 9 shows the plunger 171 partly projecting into the cylinder bore 162, and the turnbuckle 189 (Fig. 5) is adjusted to such a length that when the hand lever 16 is in its foremost position the conical rear end 203 of the piston 171 will be spaced a relatively short distance from the rear face of the annular shoulder 164', as shown in Fig. 9. The left hand plunger 171' is shown in Fig. 9 as being rearwardly displaced relative to the plunger 171, the conical rear end 203' of the plunger 171' being spaced a relatively great distance from the rear face of the annular shoulder 165'. The right hand plunger 171 may be moved rearwardly by rearward swinging movement of the hand lever 16, and when the latter hand lever is in its rearmost position, the distance of the conical rear end 203 of the plunger 171 from the rear face of the annular shoulder 164' will be the same as the distance at which the conical rear end 203' of the plunger 171' is spaced in Fig. 9 from the rear face of the annular shoulder 165'. On the other hand, when the hand lever 16' is in its foremost position, the conical rear end 203' of the plunger 171' will be spaced from the rear face of the annular shoulder 165' the same distance as that at which the conical rear end 203 of the plunger 171 is shown in Fig. 9 from the rear face of the annular shoulder 164', the turnbuckle 189' (Fig. 1) being properly adjusted to position the conical rear end 203' of the plunger 171' at the mentioned distance from the rear face of the shoulder 165' when the hand lever 16' is in its foremost position, as shown in Fig. 1.

The lower and upper rock arms 211 and 216 are secured to the rock shaft 204 in a predetermined angular relation to each other, as indicated by the angle α in Fig. 9, and the lower and upper rock arms 211' and 216' are secured to the rock shaft 204' in the same predetermined angular relation to each other, as indicated by the angle α'. The piston 196 is shown in Fig. 9 as being spaced a sufficient distance from the conical rear end of the plunger 171 to keep the recess 201 open, and the forward spherical end of the push rod 222 is shown as engaging the forward spherical end of the socket 198. The angular displacement of the rock arms 211 and 216 as indicated by the angle α is such that the piston 196 may occupy the position in which it is shown in Fig. 9 while the shift yoke 66 (Fig. 2) of the right hand steering clutch 28 is in the position in which it is shown in Fig. 2, and which position, as stated, corresponds to full engagement of the clutch 28. The full pressure of the initially tensioned loading springs 58 is effective to hold the right hand steering clutch engaged while the shift yoke 66 is positioned, as shown in Fig. 2, and while the piston 196 and the plunger 171 are positioned as shown in Fig. 9. The heavy pressure exerted by the loading springs 58 upon the floating ring 59 while the clutch 28 is engaged affords a strong resistance against swinging movement of the shift yoke 66 in the direction of arrow A in Fig. 2, and, consequently, rearward movement of the piston 196 from the position in which it is shown in Fig. 9 is likewise strongly resisted by the initial tension of the loading springs 58.

The foregoing explanations with respect to the relative angular displacement of the rock arms 211 and 216 on the rock shaft 204 similarly apply to the angular displacement of the rock arms 211' and 216' on the rock shaft 204', these latter rock arms being mounted on the rock shaft 204' in the same angular relation to each other as the rock arms 211 and 216 are mounted on the rock shaft 204, the angle α' in Fig. 9 between the rock arms 211' and 216' being the same as the angle α between the rock arms 211 and 216. Accordingly, when the hand lever 16' is adjusted to its foremost position as shown in Fig. 1 the piston 196' in the cylinder bore 163 may be spaced from the rear end of the plunger 171' to keep the piston recess 201' and the passages 199' open while the left hand steering clutch is fully engaged. The loading springs 58' of the left hand steering clutch 28' strongly resist rearward movement of the piston 196' in the cylinder bore 163, because of the heavy pressure which the loading springs 58' exert upon the floating ring 59' when the left hand steering clutch is engaged.

In connection with the description of the pump mechanism 128 (Fig. 5) it has been explained hereinbefore that when the tractor motor 1 is running and the master clutch at 8 is engaged, the forward pump comprising the gears 141 and 142 continuously discharges pressure fluid into the manifold passage 122, and that the rearward pump comprising the gears 143, 144 continuously discharges pressure fluid into the manifold passage 123. The manifold passage 122 communi-cates through the vertical bore 118, the oblique horizontal passage 117 and the cavity 193 with the cylinder bore 162, and when the plunger 171 and the piston 196 are positioned as shown in Fig. 9, the pressure fluid entering the cylinder 162 will be discharged from the space in front of the piston 196 to the space in rear of said piston through the open recess 201 and the fluid passages 199. The cylinder space in rear of the piston 196 communicates with the interior of the housing part of the support 77, and the pressure fluid discharged from the open passages 199 will therefore pass into the housing portion which, as stated, communicates with the sump 104 through the two large bores 113. In other words, when the lever 16 is in its foremost or clutch engaged position, the forward pump 141, 142 will merely be effective to circulate oil from the sump 104 through the cylinder space in front of piston 196 back to the sump 104, and the piston 196 will be subject to no appreciable hydrostatic pressure which would tend to move the piston 196 rearwardly and disengage the right hand steering clutch 28. Only a slight hydrostatic pressure will be effective in front of the piston 196 to keep the plunger 171 and the piston 169 separated from each other.

In order to disengage the right hand steering clutch 28 the operator pulls rearwardly on the handle end of the lever 16 and thus initiates rearward movement of the plunger 171 from the position in which said plunger is shown in Fig. 9. As a result of such rearward movement of the plunger 171 its conical rear end 203 will come to bear on the conical valve seat 202, and the outlet passages 199 will be closed, with the result that the pressure fluid entering the cylinder space in front of the piston 196 can no longer escape to the cylinder space in rear of the piston 196. Hydrostatic pressure will therefore quickly build up in front of the piston 196 and become high enough to start the piston 196 rearwardly against the pressure of the loading springs 58. A relatively light steady rearward pull on the handle end of the lever 16 will be sufficient to keep the conical rear end 203 of the plunger 171 in sealing contact with the valve seat 202 while the piston 196 moves rearwardly under the pressure of the fluid entering the cylinder bore 162 and accumulating in front of the piston 196. The steering clutch 28 may thus be fully disengaged without appreciable manual effort, the pump 141, 142 actually doing the work of moving the piston 196 rearwardly against the heavy and steadily increasing resistance of the loading springs 58. When the hand lever 16 arrives in its rearmost position which is determined by engagement of the stop lug 187 (Fig. 6) with the rear prong of the bracket arm 183, as shown in Fig. 5, the piston 196 recedes a short distance from the conical rear end of the plunger 171, and as a result, an amount of pressure fluid equal to the amount of pressure fluid entering through the inlet port 193 will escape through the outlet passages 199 while the lever 16 is kept in its rearmost position and while the piston 196 is subject to a relatively high hydrostatic pressure which will maintain the clutch 28 disengaged. The operator may thus keep the right hand steering clutch fully disengaged for any desired length of time by maintaining a relatively light rearward pull on the handle end of lever 16 while the latter is in its rearmost position.

From the foregoing explanations with respect to the control of the right hand steering clutch by means of the hand lever 16, the control of the left hand steering clutch by means of the hand lever 16' will be apparent. The left hand cylinder bore 163 is continuously supplied with pressure fluid by the rearward pump 143, 144 through passages 123, 121, 119 and cavity 193', and Fig. 9 shows the positions which the plunger 171' and the piston 196' occupy when the left hand steering clutch is maintained fully disengaged by hydrostatic pressure upon the piston 196'. It will be noted that the gap between the conical rear end 203' of the plunger 171' and the valve seat 202' as shown in Fig. 9 is very small, a relatively small gap being sufficient to permit escape of an amount of pressure fluid equal to the amount entering through the inlet port 193' while the left hand steering clutch is kept fully disengaged by hydrostatic pressure in front of the piston 196'. Fig. 4 shows the upper rock arm 216' in the same position as that in which it is shown in Fig. 9, and to which it may be moved in the above described manner by rearward movement of the hand lever 16' to its rearmost position.

When the hand levers 16, 16' are in their foremost or clutch-engaged positions and the pumps 141, 142 and 143, 144 are driven by the tractor engine the pressure fluid discharged from the pump 141, 142 circulates, as stated, through the space within the cylinder 162 in front of the piston 196, and the pressure fluid discharged from the pump 143, 144 circulates through the space within the cylinder 163 in front of the piston 196'. The fluid pressure within the mentioned cylinder spaces is relatively low, under these conditions, but when the discharge passages 199, 199' are closed by rearward movement of the plungers 171, 171' the fluid pressure in the mentioned cylinder spaces rises to a relatively great height. The plungers 171, 171' are closely but slidably fitted into the bore sections 174, 174' of the plunger brackets 164 and 165, respectively, and when the accumulated fluid in front of the pistons 196 and 196' is under relatively high pressure, any seepage through the bore sections 174, 174' past the plungers 171, 171' will reach the bore sections 173, 173'. In order to dispose of the fluid seeping into the bore sections 173, 173', said bore sections are connected with the housing part of the support 77 through bleeding passages as best shown in Fig. 9. Drilled into a longitudinal rib at the outer side of the barrel portion 82, as indicated in Fig. 7, is a straight horizontal bore 227, and a similar bore 227' is drilled into a longitudinal rib at the outer side of the barrel portion 83. The plunger bracket 164 has an angular passage 228 which connects the bore section 173 with the forward end of the bore 227, and the plunger bracket 165 has a similar angular passage 228' which connects the bore section 173' with the forward end of the bore 227'. The bores 227 and 227' communicate at their rear ends with the interior of the housing part of the support 77, and fluid seeping past the plungers 171, 171' through the bore sections 174, 174' will be returned from the bore sections 173, 173', through angular passages 228, 228' and horizontal passages 227, 227' to the housing part of the support 77 and from the latter to the sump 104 through the bores 113.

In operation of the tractor it is sometimes desirable, and under certain conditions necessary, that for the purpose of making a turn the corresponding steering clutch be not fully disengaged. For instance, if a heavily loaded trailer is hitched to the drawbar 27 and the vehicle train proceeds downhill on a grade, full disengagement of one of the steering clutches would create a serious hazard because the vehicle train may jack-knife and turn over under the push of the trailer. For the purpose of avoiding such an accident the steering clutches must be operable reliably and precisely to control the drive of the track belts, that is, the steering clutches must be gradually disengageable to any desired extent and they must be capable of being precisely held in any condition of partial disengagement for any desired length of time. The clutch control mechanism herein disclosed is particularly suitable to satisfy this important requirement. Rearward movement of the hand lever 16 from its foremost position, as explained hereinbefore, brings the conical rear end of the plunger 171 into sealing engagement with the valve seat 202, and the outlet passages remain closed as long as the operator follows up the rearward movement of the piston 196 by rearward movement of the hand lever. It will be seen, however, that the piston 196 may be arrested at any point of its travel within the cylinder bore 162, it being only necessary for the operator to discontinue the mentioned rearward follow-up movement of the hand lever 16. When the operator stops said follow-up movement of the hand lever 16 at any point short of the rearmost or fully disengaged position of the hand lever, the piston 196 will recede a very short distance from the arrested plunger 171, and the same amount of pressure fluid which enters through the inlet port 193 into the cylinder space 162 in front of the piston 196 will then be discharged through the outlet passages 199, and fluid under pressure in front of piston 196 will be effective to prevent forward movement of the piston under the more or less heavy counterpressure of the loading springs 58, the extent of said counterpressure depending on the extent of disengagement of the clutch. Thus, the operator is able to disengage the right hand steering clutch either fully or partly to any desired extent and to keep the clutch fully or partly disengaged for any desired length of time. The position of the hand lever 16 is an accurate indication of the degree of clutch disengagement, and the clutch responds quickly and accurately to movement of the hand lever 16. From any intermediate position of the hand lever 16 the latter may be moved either forwardly to gradually reengage the clutch, or rearwardly to gradually disengage the clutch more fully.

The foregoing explanations with respect to partial disengagement of the right hand steering clutch similarly apply to the left hand steering clutch, and it will be seen that the left hand steering clutch 28' will quickly and accurately respond to back and forth movement of the hand lever 16', the same as has been described hereinabove in connection with the hand lever 16 and right hand steering clutch 28.

The control system described in detail hereinabove is schematically shown in Fig. 12, and the fluid passages are diagrammatically outlined in said figure to illustrate the principle of the system more clearly. To avoid crossing of the fluid passages, the pump gears 143, 144 are shown in Fig. 12 in front of the pump gears 141, 142. The fluid pumps 141, 142 and 143, 144 draw fluid from the common sump 104 and are hydraulically connected with hydraulic servomotors, respectively, one of the servomotors comprising the cylinder 162 and the piston 196 and being supplied with pressure fluid by the pump 141, 142, and the other of the servomotors comprising the cylinder 163 and the piston 196' and being supplied with pressure fluid by the pump 143, 144. The bore 156 (Fig. 8) in the end plate 139 of the pump unit forms an open discharge passage of the pump 143, 144, and said open discharge passage communicates with the open inlet passage 193' (Fig. 4) of the servomotor 163, 196' through the passages 119, 121 and 123 (Figs. 2 and 4). Similarly, the bore 159 (Fig. 11) in the pump body 129 and the bore 161 (Fig. 8) in the end plate 139 of the pump unit form an open discharge passage of the pump 141, 142, and said open discharge passage 159, 161 communicates with the open inlet passage 193 (Fig. 4) of the servomotor 162, 196 through the passages 117, 118, 122 (Figs. 2 and 4). In other words, the passages 119, 121 and 123 constitute fluid conduit means having open ends at 156 and 193' in communication, respectively, with the pressure side of the pump 143, 144, and with the cylinder bore 163 at a point remote from the open end of the latter; and the passages 117, 118 and 122 constitute fluid conduit means having open ends at 161 and 193 in communication, respectively, with the pressure side of the pump 141, 142, and with the cylinder bore 162 at a point remote from the open end of the latter. The reciprocable parts of the servomotors, which in the illustrated embodiment of the invention are the pistons, have fluid outlet passages 199, 199', respectively, the recesses 201, 201' affording fluid outlet ports at the pressure sides of the pistons 196, 196', respectively. The plungers 171, 171' constitute manually adjustable followers for closing the outlet ports 201, 201', respectively. The reciprocable parts of the servomotors are operatively connected, respectively, with actuating members of friction devices, for moving said actuating members upon delivery of pressure fluid through the inlet passages 193, 193' and upon closure of the outlet ports 201, 201'. The friction devices, in the illustrated embodiment of the invention are represented by the clutches 28, 28', but it will be obvious that the system lends itself to use in connection with other types of friction devices for controlling the drive of traction devices at opposite sides of a motor vehicle.

Referring to Figs. 1 and 5, it will be noted that the support 77 and enclosed parts, together with the sump 104, the pump mechanism 128, and the plunger brackets 164, 165 may readily be installed, as an assembled unit, on and removed as an assembled unit from the tractor while the steering clutch 28, 28' and the shift yokes 66, 66' are in place on the tractor. The bolts 212, 212' for securing the lower rock arms 211, 211' to the rock shafts 204, 204' are accessible, as stated, through the top openings 74, 74', respectively, of the housing 15, and the lower rock arms 211, 211' may therefore be disconnected from the rock shafts 204, 204' preparatory to removal of the mentioned assembled unit from the tractor. Likewise, the mounting bolts 78, 80, 88, 97 and the pivot pins 178 for the turnbuckles 189, 189' may be removed preparatory to removal of the mentioned assembled unit from the tractor. In order to install the assembled control mechanism on the tractor, an analogous procedure may be followed, as will be readily understood from the foregoing explanations.

It should be understood that the invention claimed herein is not limited to the exact details of design and construction disclosed, and it is contemplated as including modifications within the scope of the appended claims.

It is claimed and desired to secure by Letters Patent:

1. In a motor vehicle of the type having ground engaging traction devices at opposite sides thereof and means for steering said vehicle by driving comprising a pair of friction devices and separate actuating members therefor selectively operable, respectively, to control the transmission of power to said traction devices, the combination of a pair of hydraulic servomotors each comprising a stationary part having an open fluid inlet passage, a reciprocable part having a fluid outlet passage, and control means operable to open and close said outlet passage; means operatively connecting said reciprocable parts, respectively, with said actuating members for moving the latter upon delivery of pressure fluid through said inlet passages and closure of said outlet passages, and a pair of fluid pumps supplied with energy from the vehicle motor and having open discharge passages in communication, respectively, with said fluid inlet passages for individually supplying said servomotors with pressure fluid.

2. In a motor vehicle of the type having ground engaging traction devices at opposite sides thereof and means for steering said vehicle by driving comprising a pair of friction devices and actuating members therefor operable, respectively, to control the transmission of power to said traction devices, the combination of a pair of hydraulic servomotors each comprising a stationary part mounted on the vehicle body and having an open fluid inlet passage, a reciprocable part having a fluid outlet passage, and a control member fitted into said stationary part for reciprocating movement relative thereto in the same direction as said reciprocable part and being abuttable with the latter to close said fluid outlet passage; means operatively connecting said reciprocable parts, respectively, with said actuating members for moving the latter upon delivery of pressure fluid through said inlet passages and closure of said outlet passages; and a pair of fluid pumps drivingly connected with the vehicle motor and having open discharge passages in communication, respectively, with said fluid inlet passages for individually supplying said servomotors with pressure fluid.

3. In a motor vehicle of the type having ground engaging traction devices at opposite sides thereof and means for steering said vehicle by driving comprising a pair of friction devices and actuating members therefor operable respectively, to control the transmission of power to said traction devices, the combination of a pair of cylinders mounted on the vehicle body and each having an open fluid inlet port adjacent to one end thereof; a pair of pistons mounted, respectively, within said cylinders and each having a pressure side facing said one end of its respective cylinder, and a fluid discharge port at said pressure side; manually adjustable followers for said pistons mounted, respectively, on said cylinders and movable against said pressure sides of said pistons to close said discharge ports; thrust transmitting means operable, respectively, by said pistons upon advance movement thereof from said one end of their respective cylinders towards the other, to move said actuating members, and a pair of fluid pumps drivingly connected with the vehicle motor and having open discharge passages in communication, respectively, with said fluid inlet ports for individually supplying said cylinders with pressure fluid.

4. In a motor vehicle of the type having ground engaging traction devices at opposite sides thereof and means for steering said vehicle by driving comprising a pair of friction devices and actuating members therefor operable, respectively, to control the transmission of power to said traction devices, the combination of a pair of cylinders mounted on the vehicle body and each having an open fluid inlet port adjacent to one end thereof; a pair of pistons mounted, respectively, within said cylinders and each having a pressure side facing said one end of its respective cylinder, and a fluid discharge port at said pressure side; manually adjustable followers for said pistons mounted, respectively, on said cylinders, each of said followers comprising a cylindrical stem portion of smaller diameter than its respective piston reciprocably and sealingly fitted into an axial aperture of its respective cylinder at said one end thereof, and a seat on said stem portion engageable with the discharge port of the respective piston for closing said discharge port; thrust transmitting means operable, respectively, by said pistons upon advance movement thereof from said one end of their respective cylinders towards the other, to move said actuating members, and a pair of fluid pumps drivingly connected with the vehicle motor and having open discharge passages in communication, respectively, with said fluid inlet ports for individually supplying said cylinders with pressure fluid.

5. In a motor vehicle of the type having ground engaging traction devices at opposite sides thereof and means for steering said vehicle by driving comprising a pair of friction devices and separate actuating members therefor selectively operable, respectively, to control the transmission of power to said traction devices, the combination of fluid storage means, a pair of cylinders having open ends, respectively, in communication with said fluid storage means, a pair of fluid pumps communicating at their suction sides with said fluid storage means and operable to continuously draw fluid from said storage means, fluid conduit means having open ends in communication, respectively, with the pressure side of one of said pumps and with one of said cylinders at a point remote from said open end of the latter, other fluid conduit means independent of said first mentioned fluid conduit means having open ends in communication, respectively, with the pressure side of the other of said pumps and with the other of said cylinders at a point remote from said open end of said other cylinder, a pair of pistons reciprocably mounted, respectively, in said cylinders and having passages to permit continuous circulation of fluid by said pumps through said conduit means and piston passages, a pair of individually adjustable followers for said pistons cooperable, respectively, with said pistons to close said piston passages, and means operatively connecting said pistons, respectively, with said actuating members of said friction devices for moving said actuating members by movement of said pistons in response to accumulation of pressure fluid in said cylinders upon closure of said piston passages.

WILLIAM H. BRUCE.
DOUGLAS W. ERSKINE.

REFERENCES CITED

The following references are of record in the file of this patent:

UNITED STATES PATENTS

| Number | Name | Date |
|---|---|---|
| 1,921,590 | Staude | Aug. 8, 1933 |
| 2,337,637 | Brown | Dec. 28, 1943 |
| 2,379,628 | Eberhard et al. | July 3, 1945 |